(12) United States Patent
De Fresart et al.

(10) Patent No.: US 11,942,894 B2
(45) Date of Patent: Mar. 26, 2024

(54) PHOTOVOLTAIC TRACKER DRIVELINE JOINT

(71) Applicant: Array Technologies, Inc., Albuquerque, NM (US)

(72) Inventors: Benjamin C. De Fresart, Albuquerque, NM (US); Jonathan Sokol, Albuquerque, NM (US); Robert Clark Rowan, Jr., Phoenix, AZ (US); Frank Heydrich, Albuquerque, NM (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 18/338,211

(22) Filed: Jun. 20, 2023

(65) Prior Publication Data

US 2023/0336114 A1    Oct. 19, 2023

Related U.S. Application Data

(62) Division of application No. 17/661,536, filed on Apr. 29, 2022, now Pat. No. 11,683,006.

(60) Provisional application No. 63/181,789, filed on Apr. 29, 2021.

(51) Int. Cl.

| | |
|---|---|
| *F24S 30/40* | (2018.01) |
| *F16C 3/02* | (2006.01) |
| *F24S 50/20* | (2018.01) |
| *H02S 20/32* | (2014.01) |
| *H02S 30/10* | (2014.01) |
| *F24S 30/00* | (2018.01) |

(52) U.S. Cl.
CPC ............... *H02S 20/32* (2014.12); *F16C 3/02* (2013.01); *F24S 30/40* (2018.05); *F24S 50/20* (2018.05); *H02S 30/10* (2014.12); *F24S 2030/11* (2018.05); *F24S 2030/15* (2018.05)

(58) Field of Classification Search
CPC .......... H02S 20/32; H02S 30/10; F24S 30/40; F24S 50/20; F24S 2030/15; F24S 2030/11; F16C 3/02
USPC .......................................................... 136/244
See application file for complete search history.

(56) References Cited

U.S. PATENT DOCUMENTS

| | | | | |
|---|---|---|---|---|
| 8,763,601 B2* | 7/2014 | Doyle | ..................... | H02S 20/00 126/645 |
| 9,482,449 B2* | 11/2016 | Cole | ..................... | F24S 30/425 |
| 2009/0223140 A1* | 9/2009 | Becker | ..................... | E06B 9/13 52/64 |
| 2013/0152915 A1* | 6/2013 | Marten | ................... | F16C 19/50 126/600 |
| 2016/0218663 A1* | 7/2016 | Werner | ................. | F24S 30/425 |

(Continued)

*Primary Examiner* — Avinash A Savani
(74) *Attorney, Agent, or Firm* — MASCHOFF BRENNAN

(57) ABSTRACT

A driveline joint may include a driveline shaft that has a plurality of slots and a shaft coupling positioned in an interior of the driveline shaft in which the shaft coupling includes one or more openings with each of the openings corresponding to one or more respective slots of the plurality of slots included in the driveline shaft. The driveline joint may include one or more spherical bearings that are each positioned between an interior lateral surface of the driveline shaft and an exterior lateral surface of the shaft coupling and against one of the openings of the shaft coupling. The driveline joint may include one or more fasteners, wherein each of the fasteners extends through one of the slots and one of the openings of the shaft coupling.

18 Claims, 8 Drawing Sheets

(56) References Cited

U.S. PATENT DOCUMENTS

| | | | | |
|---|---|---|---|---|
| 2016/0329860 A1* | 11/2016 | Kalus | .................... | H02S 20/10 |
| 2016/0365823 A1* | 12/2016 | French | .................... | H02S 40/34 |
| 2017/0279405 A1* | 9/2017 | Wares | .................... | H02S 30/10 |
| 2018/0062565 A1* | 3/2018 | Schimelpfenig | ........ | H02S 20/32 |
| 2018/0073773 A1* | 3/2018 | Grushkowitz | ............ | F16D 9/00 |
| 2018/0203222 A1* | 7/2018 | Fuhrmann | .............. | G02B 7/023 |

* cited by examiner

PHOTOVOLTAIC TRACKER DRIVELINE JOINT

CROSS-REFERENCE TO RELATED APPLICATION

This application is a divisional application of U.S. patent application Ser. No. 17/661,536, filed on Apr. 29, 2022, which claims the benefit of U.S. Patent Application Ser. No. 63/181,789, filed on Apr. 29, 2021; both disclosures of which are incorporated herein by reference in their entirety.

FIELD OF THE INVENTION

The present disclosure generally relates to a photovoltaic (PV) tracker driveline joint.

BACKGROUND

Systems of solar panels may include one or more PV modules. The PV modules may be mounted in rows on solar trackers that direct an orientation of the PV modules such that the orientation of the PV modules changes throughout a day. The PV modules may be placed in an outdoor location such that the PV modules may receive sunlight with little or no obstruction.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a driveline joint may include a driveline shaft including a plurality of slots and a shaft coupling positioned in an interior of the driveline shaft in which the shaft coupling includes one or more openings with each of the openings corresponding to one or more respective slots of the plurality of slots included in the driveline shaft. The driveline joint may include one or more spherical bearings that are each positioned between an interior lateral surface of the driveline shaft and an exterior lateral surface of the shaft coupling and against one of the openings of the shaft coupling. The driveline joint may include one or more fasteners, wherein each of the fasteners extends through one of the slots and one of the openings of the shaft coupling.

According to an aspect of an embodiment, the driveline joint may further include a first pressure plate positioned in the interior of the driveline shaft flush against a base surface of the shaft coupling, the first pressure plate being positioned to provide a first spring force against the shaft coupling. The driveline joint may further include a second pressure plate positioned in the interior of the driveline shaft flush against the base surface of the shaft coupling, the second pressure plate being positioned to provide a second spring force against the shaft coupling in a direction opposite to the first spring force provided by the first pressure plate.

According to an aspect of an embodiment, the spherical bearings may each include a curved profile corresponding to an inner surface of the driveline shaft.

According to an aspect of an embodiment, the shaft coupling may include a keyed opening at an end of the shaft coupling in which the keyed opening of the shaft coupling facilitates attachment of the shaft coupling to an output shaft via a corresponding keyed feature of the output shaft.

According to an aspect of an embodiment, the driveline shaft of the driveline joint may include a flared section at a proximal end of the driveline shaft that includes a greater diameter than a diameter corresponding to the rest of the driveline shaft, and the interior of the driveline shaft in which the shaft coupling is positioned may be the flared section of the driveline shaft at the proximal end of the driveline shaft. The spherical bearings of the driveline joint may include an annulus ring positioned in the flared section of the driveline shaft, wherein the annulus ring includes a shape and an inner diameter that corresponds to a cross-sectional shape and a diameter of the shaft coupling. The shaft coupling may be configured to interface with the annulus ring. One or more openings may be shaped and sized so that the fasteners are configured to extend through the openings of the annulus ring and fasten the driveline shaft, the annulus ring, and the shaft coupling together. The annulus ring may include a curved profile corresponding to an inner surface of the driveline shaft.

According to an aspect of an embodiment, a driveline joint may include a driveline shaft including a plurality of slots, an outer housing configured to be attached to an end of the driveline shaft in which the outer housing includes a plurality of openings along a lateral surface of the outer housing, and a shaft coupling positioned in an interior of the outer housing in which the shaft coupling includes one or more openings with each of the openings corresponding to one or more respective slots of the plurality of slots included in the driveline shaft and one or more openings of the plurality of openings included in the outer housing. The driveline joint may include one or more spherical bearings that are each positioned between an interior lateral surface of the outer housing and an exterior lateral surface of the shaft coupling and against one of the openings of the shaft coupling and one or more fasteners, wherein each of the fasteners extends through one of the slots of the driveline shaft, one of the openings of the outer housing, and one of the openings of the shaft coupling.

The driveline joint may further include a first pressure plate positioned in the interior of the driveline shaft flush against a base surface of the shaft coupling, the first pressure plate being positioned to provide a first spring force against the shaft coupling. The driveline joint may further include a second pressure plate positioned in the interior of the driveline shaft flush against the base surface of the shaft coupling, the second pressure plate being positioned to provide a second spring force against the shaft coupling in a direction opposite to the first spring force provided by the first pressure plate.

According to an aspect of an embodiment, the spherical bearings of the driveline joint may each include a curved profile corresponding to an inner surface of the outer housing.

According to an aspect of an embodiment, the shaft coupling may include a keyed opening at an end of the shaft coupling in which the keyed opening of the shaft coupling facilitates attachment of the shaft coupling to an output shaft via a corresponding keyed feature of the output shaft.

According to an aspect of an embodiment, the outer housing of the driveline joint may include a flared section at a proximal end of the outer housing that includes a greater diameter than a diameter corresponding to the rest of the outer housing. The interior of the outer housing in which the shaft coupling is positioned may be the flared section of the outer housing at the proximal end of the outer housing. The spherical bearings of the driveline joint may include an annulus ring positioned in the flared section of the outer housing in which the annulus ring includes a shape and an inner diameter that corresponds to a cross-sectional shape and a diameter of the shaft coupling with the shaft coupling being configured to interface with the annulus ring. One or more openings may be shaped and sized so that the fasteners are configured to extend through the openings of the annulus ring and fasten the driveline shaft, the outer housing, the annulus ring, and the shaft coupling together. The annulus ring may include a curved profile corresponding to an inner surface of the outer housing.

According to an aspect of an embodiment, a photovoltaic module support structure may include a photovoltaic module rail configured to be coupled to one or more photovoltaic modules, a torque tube to which the photovoltaic module rail is attached, and one or more tracker drive units that are configured to provide torque to the torque tube, wherein the provided torque causes rotation of the torque tube and the photovoltaic modules coupled to the photovoltaic module rail. The photovoltaic module support structure may include a driveline shaft that has a plurality of slots in which the driveline shaft is configured to transmit torque provided by the one or more tracker driver units to the torque tube. The photovoltaic module support structure may include one or more driveline joints that connect the one or more tracker drive units and the driveline shaft. Each of the driveline joints may include a shaft coupling positioned in an interior of the driveline shaft in which the shaft coupling includes one or more openings with each of the openings corresponding to one or more respective slots of the plurality of slots included in the driveline shaft. Each of the driveline joints may include one or more spherical bearings that are each positioned between an interior lateral surface of the driveline shaft and an exterior lateral surface of the shaft coupling and against one of the openings of the shaft coupling. Each of the driveline joints may include one or more fasteners in which each of the fasteners extends through one of the slots and one of the openings of the shaft coupling.

According to an aspect of an embodiment, the driveline joint further includes a first pressure plate positioned in the interior of the driveline shaft flush against a base surface of the shaft coupling, the first pressure plate positioned to provide a first spring force against the shaft coupling.

According to an aspect of an embodiment, the driveline shaft of a photovoltaic module support structure may include a flared section at a proximal end of the driveline shaft that includes a greater diameter than a diameter corresponding to the rest of the driveline shaft, and the interior of the driveline shaft in which the shaft coupling is positioned may be the flared section of the driveline shaft at the proximal end of the driveline shaft. The spherical bearings of the photovoltaic module support structure may include an annulus ring positioned in the flared section of the driveline shaft in which the annulus ring includes a shape and an inner diameter that corresponds to a cross-sectional shape and a diameter of the shaft coupling with the shaft coupling being configured to interface with the annulus ring. The annulus ring may include one or more openings shaped and sized so that the fasteners are configured to extend through the openings of the annulus ring and fasten the driveline shaft, the annulus ring, and the shaft coupling together.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The present disclosure relates to, among other things, a driveline joint capable of connecting two or more shafts together at their ends for the purpose of transmitting torque through a driveline while permitting some degree of angular misalignment. The driveline joint may include a shaft coupling, two or more bearings, and a number of fasteners corresponding to the number of bearings. The shaft coupling may be positioned inside a driveline shaft that includes, for example, a tubing extending along a driveline. The driveline shaft may include a number of slots positioned axially around the tubing (e.g., cut and/or otherwise formed into the surface of the tubing) near both ends through which the fasteners of the driveline joint may be inserted to couple the shaft coupling to the driveline shaft. In some embodiments, the driveline joint may include a pressure plate for limiting axial movement of the driveline joint and/or mitigating vibrations experienced by the driveline and/or the driveline joint.

The driveline joint according to the present disclosure may provide a number of advantages over existing methods and/or systems of connecting segments of a driveline and transmitting torque through the driveline. The driveline joint may be built using a number of components that may be fabricated in high volumes. As such, deploying the driveline joint may include lower costs relative to existing methods and/or systems of connecting driveline segments. The driveline joint may decrease operating costs of an array of PV modules. Because the driveline joint may include a number of replaceable components, maintenance costs and/or time of the array of PV modules may be decreased.

Embodiments of the present disclosure are explained with reference to the accompanying figures.

Figure 1A:
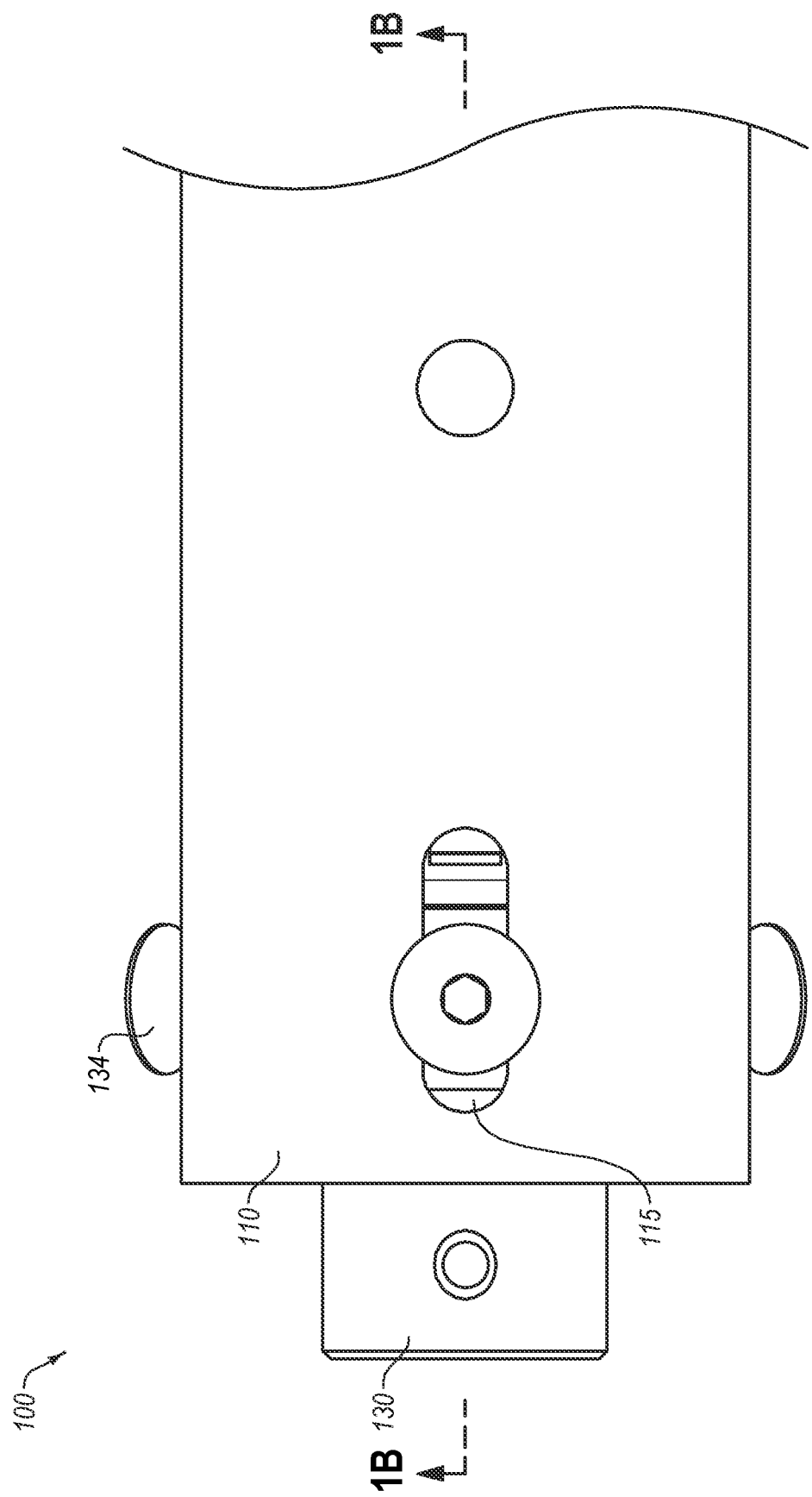
FIG. 1A illustrates a side view of an example embodiment of a driveline joint according to the present disclosure.
Figure 1B:
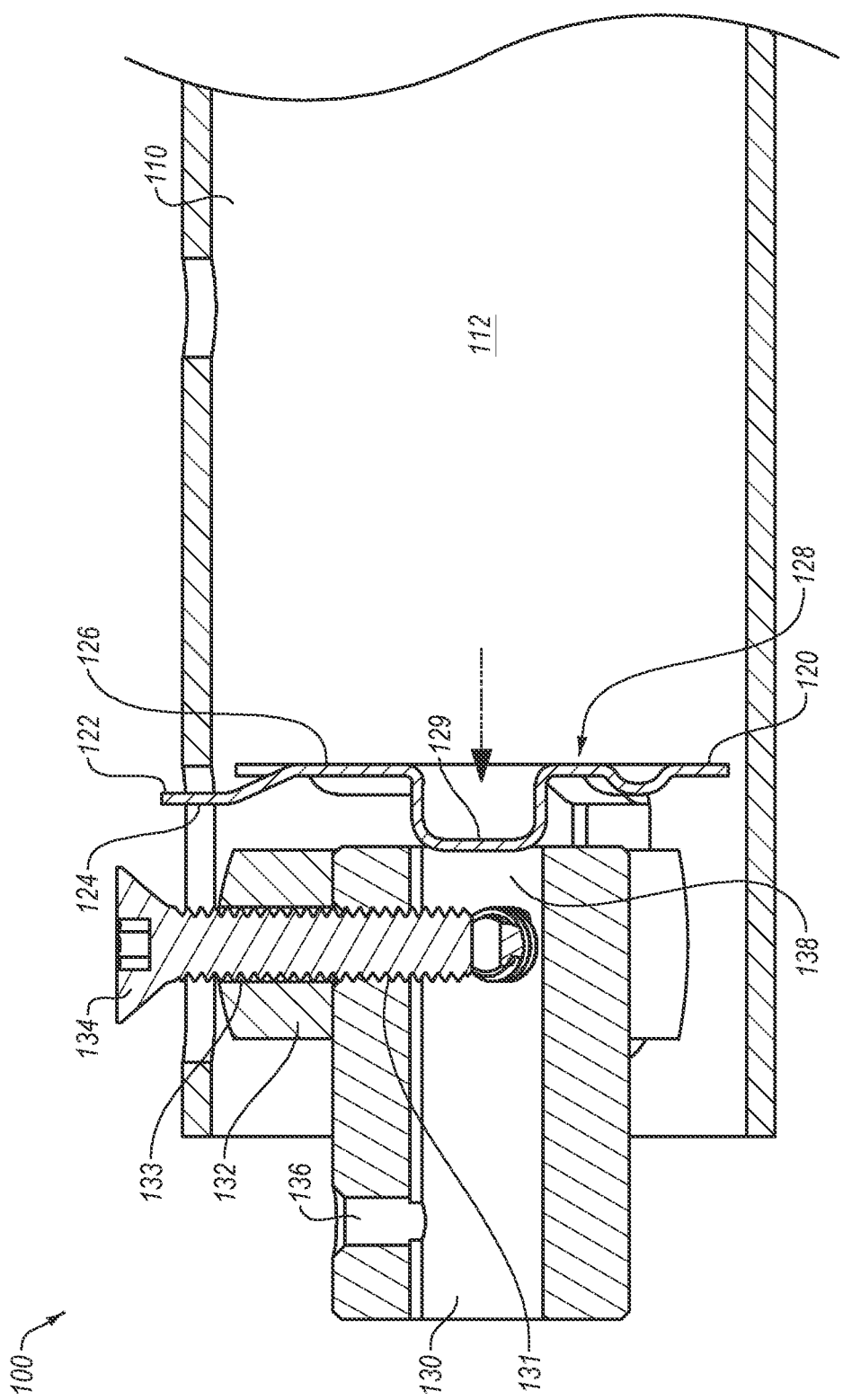
FIG. 1B illustrates a cross-sectional view of the example embodiment of the driveline joint according to the present disclosure.

FIGS. 1A and 1B illustrate a side view of an example embodiment of a driveline joint 100 according to the present disclosure. The driveline joint 100 may include a driveline shaft 110 in which a shaft coupling 130 is positioned. The driveline shaft 110 may include a number of slots, one of which is denoted at 115, through which one or more fasteners, one example of which is denoted at 134, may be inserted. The fasteners 134 may secure one or more bearings 132 to the surface of the shaft coupling 130. In some embodiments, a pressure plate 120 may be positioned in the driveline shaft 110 such that a surface of the pressure plate 120 is aligned with a base surface 138 of the shaft coupling 130.

Figure 2:
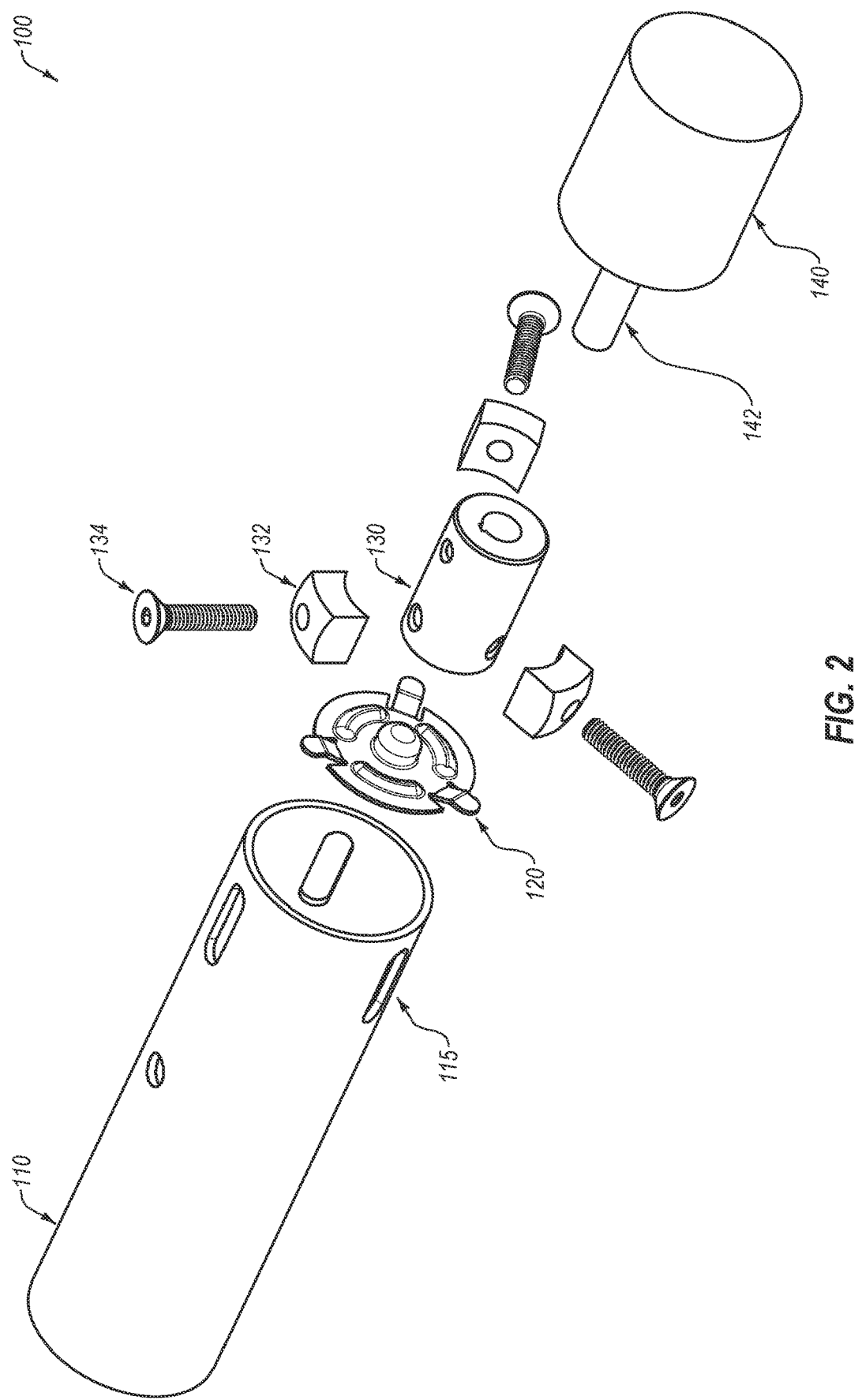
FIG. 2 illustrates an exploded view of the example embodiment of the driveline joint according to the present disclosure.

The shaft coupling 130 may be coupled to an output shaft 140 (such as shown in FIG. 2) of a gear box (not shown), and the driveline shaft 110 may span between two gear boxes that each include the shaft coupling 130. The gear box may affect rotation of the output shaft, and the shaft coupling 130 may transmit the torque of the output shaft to a driveline such that the orientation of an array of PV modules coupled to the driveline shaft 110 may be rotated. In some embodiments, the shaft coupling 130 may include one or more mechanisms for securing and/or preventing dislocation of the output shaft of a gear box. For example, as illustrated in FIG. 1B, the shaft coupling 130 may include an opening 136 in which the output shaft 140 of the gear box may be keyed to the shaft coupling 130. Additionally or alternatively, the shaft coupling 130 may include a threaded interior surface, one or more clasps, or other arrangement for securing the output shaft to the shaft coupling 130.

In some embodiments, as is shown in FIG. 1B, and in FIG. 2, the driveline joint 100 may include one or more of the pressure plates 120. The pressure plate 120 may limit axial movement between the shaft coupling 130 and the driveline shaft 110 by applying spring force to the shaft coupling 130. In these and other embodiments, the spring force from the pressure plate 120 may bias the fasteners 134 towards one end of the slots 115 such that the fasteners 134 may still move within the slots 115 by overcoming the spring force but are otherwise biased to remain in a stationary location within the slots. For example, when there is a mismatch between joints at either end of the driveline shaft 110, the driveline shaft 110 may experience play in a longitudinal direction. The pressure plate 120 may reduce, eliminate, or remove some of the play by applying the spring force. Additionally or alternatively, the pressure plate 120 may reduce, eliminate, or remove vibrations as experienced when the gear box(es) are causing rotation of the driveline shaft 110. Additionally or alternatively, the pressure plate 120 may decrease sliding movement of the fasteners 134 within the slots 115 and reduce rattling in the driveline joint 100, such as in circumstances in which the driveline is installed at an incline. As such, the pressure plate 120 may mitigate damage to the driveline joint 100 caused by movement of the array of PV modules and/or forces on the components of the array of PV modules caused by weather conditions (e.g., wind, rain, hail, snow, among others) and/or human actions (e.g., maintenance work on the array of PV modules, unintentional impacts, among others), as well as mitigating damage due to repeated motions, rattling, vibrations, among others, caused by play along the driveline shaft 110.

In some embodiments, the pressure plate 120 may include a number of tabs 122 in which each tab 122 is configured to interface with one of the slots 115. As such the number of tabs 122 may correspond to the number of slots 115, and/or the tabs 122 may be arranged equidistant from one another around the circumference of the pressure plate 120 to facilitate interfacing with the slots 115. In these and other embodiments, the tabs 122 may include an inclined body such that the surface 124 of the pressure plate 120 is not aligned with the surface 126 of the tabs 122, which may provide the spring force (as denoted by the arrow) capable of being exerted on the shaft coupling 130. For example, a given pressure plate may include inclined tabs oriented such that the plane of the surface of the given pressure plate is closer to a given shaft coupling than the plane in which the tabs are situated (e.g., a central body 128 of the pressure plate 120 may be oriented towards the distal end 112 of the driveline shaft 110 with the opening and the tabs 122 extending from the central body away from the distal end 112 and are seated in the slots 115 towards the middle of the driveline shaft 110). Additionally or alternatively, the pressure plate 120 may be oriented in the opposite direction. In this example, pressure applied toward the surface of the given pressure plate by the shaft coupling 130 may affect a spring pressure in the opposite direction (e.g., in a direction opposite to the orientation of the arrow). Additionally or alternatively, the surface of the pressure plate 120 may include a central post and/or one or more protruding bumpers 129 (in which FIG. 1B illustrates an embodiment including the protruding bumpers 129). The shape of the central post and/or the bumpers 129 may be based on the shape of the shaft coupling 130 such that one or more surfaces of the shaft coupling 130 may be positioned flush against the pressure plate 120. Additionally or alternatively, two pressure plates may be included in the driveline joint 100 such that a first pressure plate is positioned against a first base surface of the shaft coupling 130, and a second pressure plate is positioned against a second base surface of the shaft coupling 130. For example, the first pressure plate may be positioned as described above, with the tabs seated in the end of the slot towards the middle of the driveline shaft 110, and the second pressure plate may be positioned with the tabs seated in the end of the slot towards the distal end of the driveline shaft 110 (e.g., the end with the opening). By using two pressure plates, a spring force may be applied to the fasteners (and thereby to the shaft coupling 130) in both longitudinal directions of the driveline shaft 110. By providing the spring force in both directions, the motion, play, vibrations, or other motions in both longitudinal directions may be accounted for and/or mitigated.

In some embodiments, one or more of the components of the driveline joint 100, such as the driveline shaft 110, the pressure plate 120, the shaft coupling 130, the bearings 132, and/or the fasteners 134, may be manufactured to reduce the cost of the driveline joint 100 relative to existing joints, such as u-joints. For example, the driveline shaft 110 may include a cylindrical tube in which the tubing is manufactured from steel via a rolled-tubing process and/or using materials such as extruded aluminum, cast iron, high-density polyethylene, or polyvinyl chloride. As additional or alternative examples, the pressure plate 120 may be manufactured using a stamping process, and the bearings 132 may be manufactured via an injection molding process.

Figure 1C:
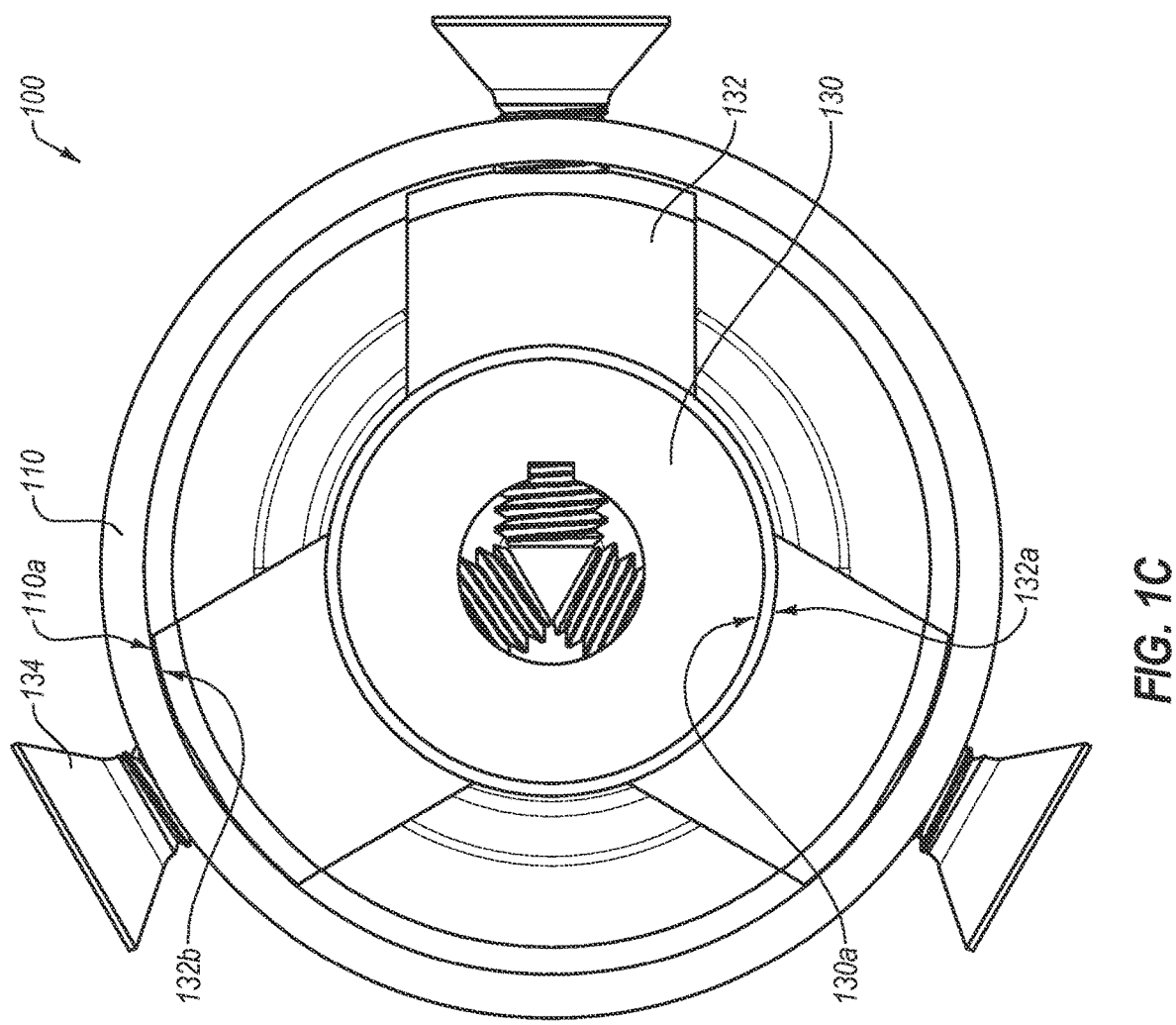
FIG. 1C illustrates a frontal view of the example embodiment of the driveline joint according to the present disclosure.
Figure 1D:
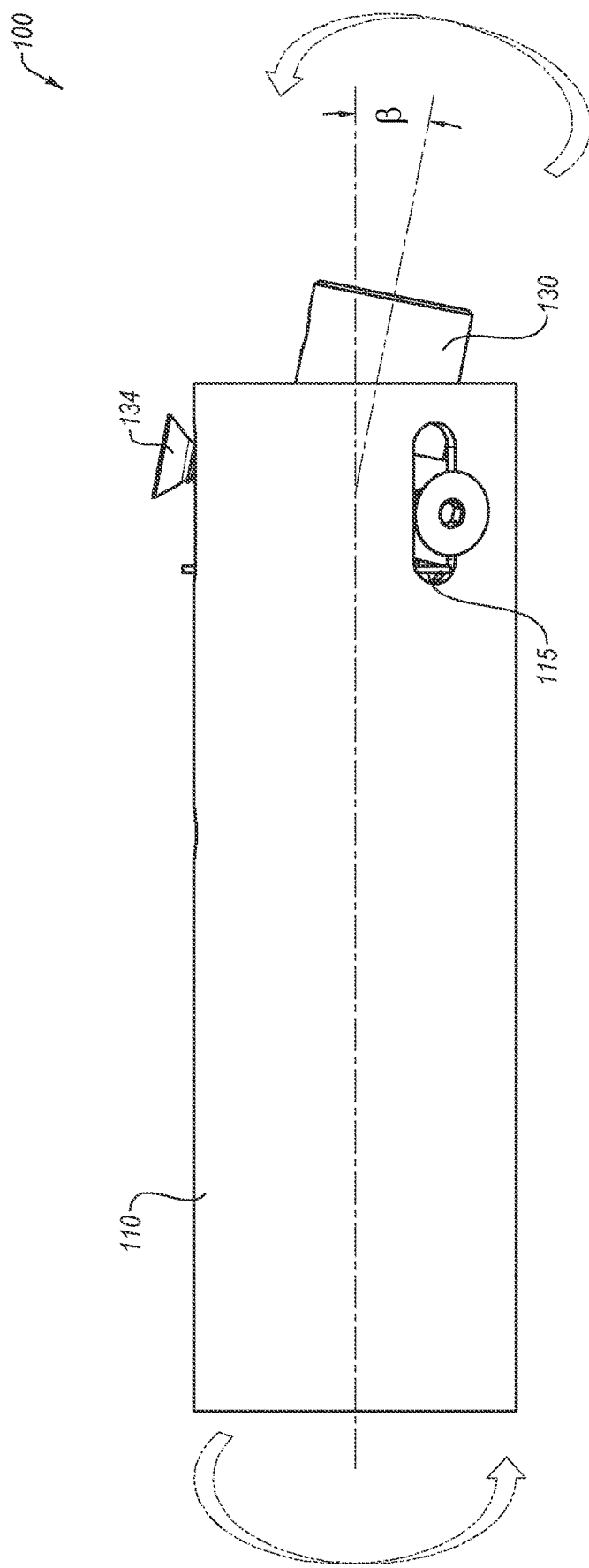
FIG. 1D illustrates a side view of the example embodiment of the driveline joint including angular misalignment of the driveline shaft and the shaft coupling according to the present disclosure.

FIG. 1C illustrates a frontal view of the example embodiment of the driveline joint 100 according to the present disclosure. FIG. 1D illustrates a side view of the example embodiment of the driveline joint 100 including and example of angular misalignment of the driveline shaft 110 and the shaft coupling 130 according to the present disclosure.

FIG. 2 illustrates an exploded view of the example embodiment of the driveline joint 100 according to the present disclosure. The bearings 132 and the fasteners 134 may maintain alignment of the shaft coupling 130 inside the driveline shaft 110. In some circumstances, a given array of PV modules may be installed on an uneven surface such that a non-flat slope exists between two or more gear boxes 140. In these and other circumstances, angular misalignment between the shaft coupling 130 and the driveline shaft 110 may be compensated for by the bearings 132 and the fasteners 134.

As illustrated in FIGS. 1C and 2, the shaft coupling 130 may include one or more of the bearings 132 and a corresponding number of the fasteners 134. In some embodiments, the lateral surface 130a of the shaft coupling 130 may include two or more equally spaced openings 131 against which the bearings 132 may be positioned. As shown in FIG. 1B, the bearings 132 may include an opening 133 through which each of the fasteners 134 may be inserted. In these and other embodiments, one or more surfaces of bearings 132 may be configured to fit flush against the lateral surface 130a of the shaft coupling 130 and/or the interior lateral surface 110a of the driveline shaft 110. For example, a given bearing may include a rounded (e.g., spherical) bearing having an arced bottom surface 132a configured to be positioned directly (e.g., flush) against a cylindrical shaft coupling and a rounded (e.g., spherical) top surface 132b configured to be positioned directly (e.g., flush) against the interior surface 110a of a cylindrical driveline shaft. Stated another way, the spherical curve of the top surface 132b of the bearings 132 may be selected to match the curve of the inner surface 110a of the driveline shaft 110. The rounded top surface 132b of the given bearing may allow two driveline shafts 110 attached to the shaft coupling to pivot at the point where the axes of the driveline shafts 110 intersect.

Additionally or alternatively, the openings 133 in the bearings 132 and/or the openings 131 in the shaft coupling 130 may be threaded, partially threaded, or smooth-bored depending on the type of fasteners 134 used to couple the bearings 132 and the shaft coupling 130. For example, a given first set of fasteners may include screws having fully threaded bodies, and a given second set of fasteners may include screws having partially threaded bodies. Bearings and/or shaft couplings secured using the given first set of fasteners may include openings having fully threaded interior surfaces, and bearings and/or shaft couplings secured using the given second set of fasteners may include openings having partially threaded interior surfaces. As another example, a given third set of fasteners may include studs, pins, bolts, or any other fasteners that may be pressed, bonded, drilled, or otherwise coupled to the bearings and the shaft coupling 130.

In some embodiments, the lengths of the slots 115 may be sized based on a maximum angle of misalignment possible for the driveline joint 100. For example, an output shaft 142 of the gear boxes 140 at either end of the driveline shaft 110 may be oriented in different directions (e.g., may not be directly co-linear with each other), and the driveline joint 100 may facilitate operation despite that misalignment and the length of the slots 115 may be based on the magnitude of the misalignment. In these and other embodiments, the maximum angle of misalignment for different driveline joints 100 may differ based on the angle of the incline at which the array of PV modules is installed. To compensate for axial misalignment of the shaft coupling 130, the lengths of the slots 115 may be sized such that the fasteners 134 do not contact either end of the slots 115 in the driveline shaft 110 during rotation of the driveline shaft 110. As such, the length of the slots 115 may be increased for driveline shafts 110 installed on inclined surfaces relative to driveline shafts 110 installed on flatter surfaces.

As illustrated in FIG. 1D, the driveline shaft 110 and the shaft coupling 130 are misaligned at an angle of p. In some embodiments, the driveline joint 100 compensates for angular misalignment between the driveline shaft 110 and the shaft coupling 130 by allowing the fasteners 134 coupling the shaft coupling 130 to the driveline shaft 110 to shift around in the slots 115.

In some embodiments, the driveline shaft 110 may be a sheath or other covering that may be bonded, coupled, or otherwise attached at an end of a beam between gear boxes 140. Additionally or alternatively, the driveline shaft 110 may be formed as part of the beam between the gear boxes 140, such as a solid beam with hollow ends, or a hollow beam along its entire length between the gear boxes 140.

While illustrated as including three slots 115, any number of slots may be included. For example, the driveline shaft 110 may include two slots, four slots, five slots, six slots, to accommodate differing numbers of bearings 132 and/or fasteners 134 being used to couple the output shaft 130 to the driveline shaft 110.

Figure 3:
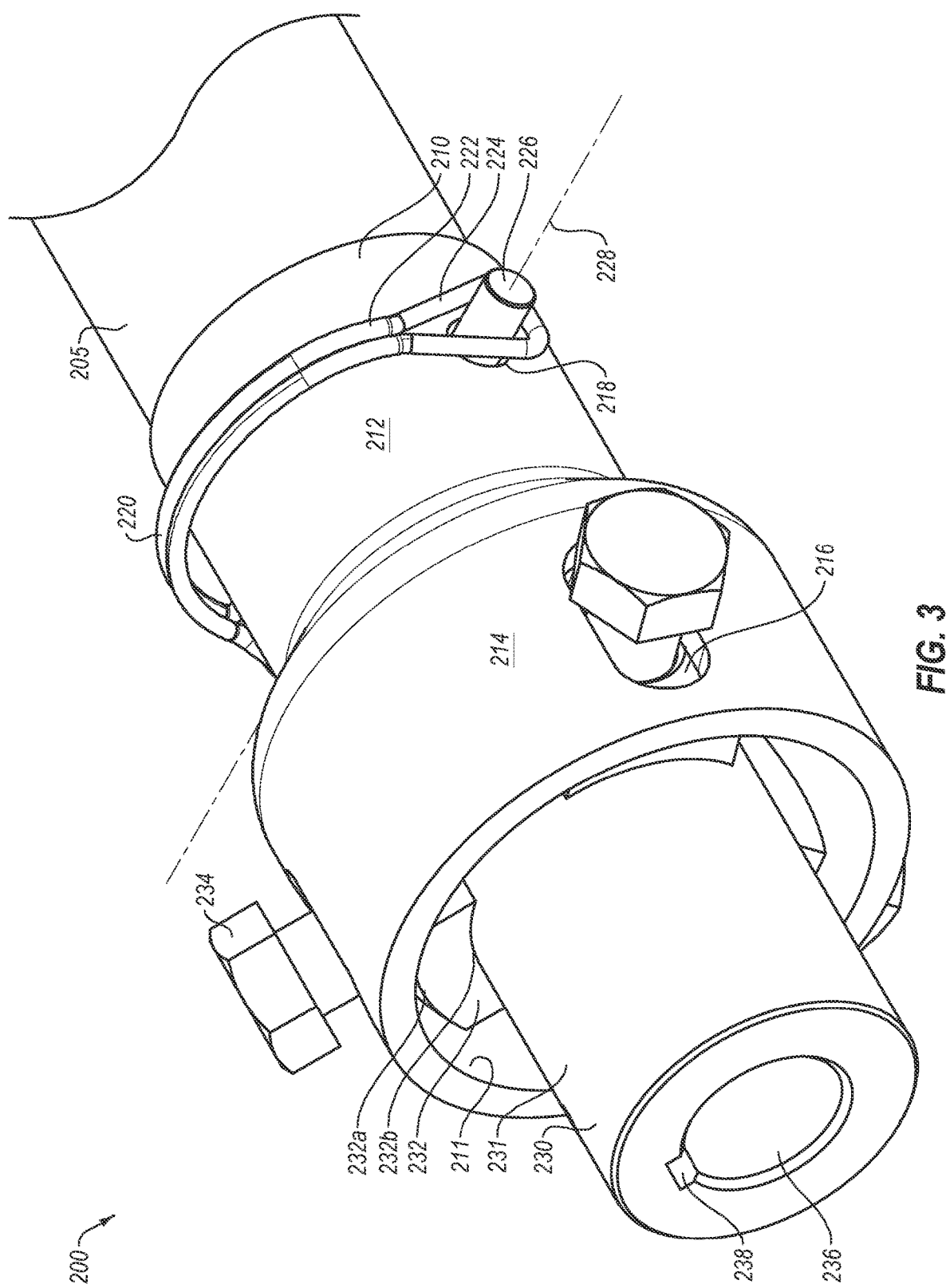
FIG. 3 illustrates a perspective view of a second example embodiment of a driveline joint according to the present disclosure.

FIG. 3 illustrates a perspective view of a second example embodiment of a driveline joint 200 according to the present disclosure. The driveline joint 200 may include a driveline shaft 205 to which an outer housing 210 may be coupled via a connecting hinge 220. The outer housing 210 may facilitate coupling of the driveline shaft 205 to a shaft coupling 230 including a keyed opening 236 that allows coupling of an output shaft (not shown) to the driveline shaft 205 via the shaft coupling 230.

In some situations, the shaft coupling 230 and/or coupling components associated with the shaft coupling 230, such as spherical bearings 232, may include dimensions that do not fully align with the dimensions of the driveline shaft 205. For example, the driveline shaft 205 may include a first exterior cross-sectional diameter, while the shaft coupling 230 includes a second interior cross-sectional diameter (e.g., substantially the same size as or even larger than the driveline shaft 205). As such, attaching the shaft coupling 230 directly to the driveline shaft 205 may involve an intermediary component, such as the outer housing 210, that accounts for differences in dimensions, geometry, or other characteristics between the shaft coupling 230 and the driveline shaft 205. In these and other situations, the outer housing 210 may be an extension of the driveline shaft 205. Additionally or alternatively, the outer housing 210 may be a separate component that is attachable to an end of the driveline shaft 205.

In some embodiments, the outer housing 210 may include a flared portion 214 that includes a larger interior diameter than the rest of the outer housing 210. Both the flared portion 214 and an unflared portion 212 of the outer housing 210 may include features that allow the outer housing 210 to be coupled to the driveline shaft 205 and/or the shaft coupling 230. For example, the unflared portion 212 of the outer housing 210 may include one or more openings 218 through which fasteners 226 may be inserted to secure the outer housing 210 to the driveline shaft 205 as illustrated in FIG. 3. As another example, the flared portion 214 of the outer housing 210 may include one or more oblong openings 216 through which fasteners may be inserted to secure the outer housing 210 to the shaft coupling 230 as illustrated in FIG. 3.

Although illustrated in FIG. 3 as having a corresponding number of openings as the components to which the outer housing 210 is coupled, the flared portion 214 and/or the unflared portion 212 may include any number of features that allow coupling of the outer housing 210 to other driveline components. For example, the flared portion 214 and/or the unflared portion 212 may include any number of openings so that the outer housing 210 may be coupled to driveline components of various specifications (i.e., including different numbers of corresponding openings). As another example, the outer housing 210 may include grooves, notches, tabs, or any other features that may be used to secure the outer housing 210 to other driveline components.

In some embodiments, the outer housing 210 may be coupled to the driveline shaft 205 via the connecting hinge 220. The connecting hinge 220 may include a clasp 222 with a semi-circular shape that includes a loop 224 at each end of the clasp 222. The loops 224 may be aligned with the opening 218 through the lateral surface of the outer housing 210, such as along the unflared portion 212, and an opening (not shown) in the underlying driveline shaft 205. One or more fasteners 226 may be inserted through the loop 224 and the aligned openings to secure the clasp 222, the outer housing 210, and the driveline shaft 205 together. Although illustrated as a peg-like component, the fastener 226 may be a rod that extends through the unflared portion 212 of the outer housing 210. Additionally or alternatively, the fastener 226 may be any fastening component, such as a pin, a bolt, a nut, and/or a screw. After securing the connecting hinge 220 to at least the outer housing 210, the clasp 222 may be rotated along an axis 228 formed by the one or more fasteners 226 that are inserted through the loops 224 and the openings in the outer housing 210; rotating the clasp 222 along the axis formed by the fasteners 226 may allow the connecting hinge 220 to provide an additional securing force for locking the outer housing 210 and the driveline shaft 205 together.

In some embodiments, the flared portion 214 of the outer housing 210 may be coupled to the shaft coupling 230 via one or more spherical bearings 232 and corresponding fasteners 234. Each of the spherical bearings 232 may include an opening (not shown) through which the fasteners 234 may be inserted. By aligning the openings of the spherical bearings 232 with one or more of the openings 216 in the flared portion 214 of the outer housing 210 and one or more openings in the shaft coupling 230, the fasteners 234 may secure the spherical bearings 232 to the outer surface 231 of the shaft coupling 230 and/or the inner surface 211 of the outer housing 210. Each of the spherical bearings 232 may include a curved profile such that an inner surface 232b and an outer surface 232a of each spherical bearing 232 is rounded like a surface of a sphere. The curved profile of the spherical bearings 232 may allow some degree of rotation between the shaft coupling 230 and the outer housing 210 to account for misalignments, vibrations, and/or movements between the shaft coupling 230 and the outer housing 210 in a similar or comparable manner to the spherical bearings 132 of FIGS. 1A-1D and 2.

Figure 4A:
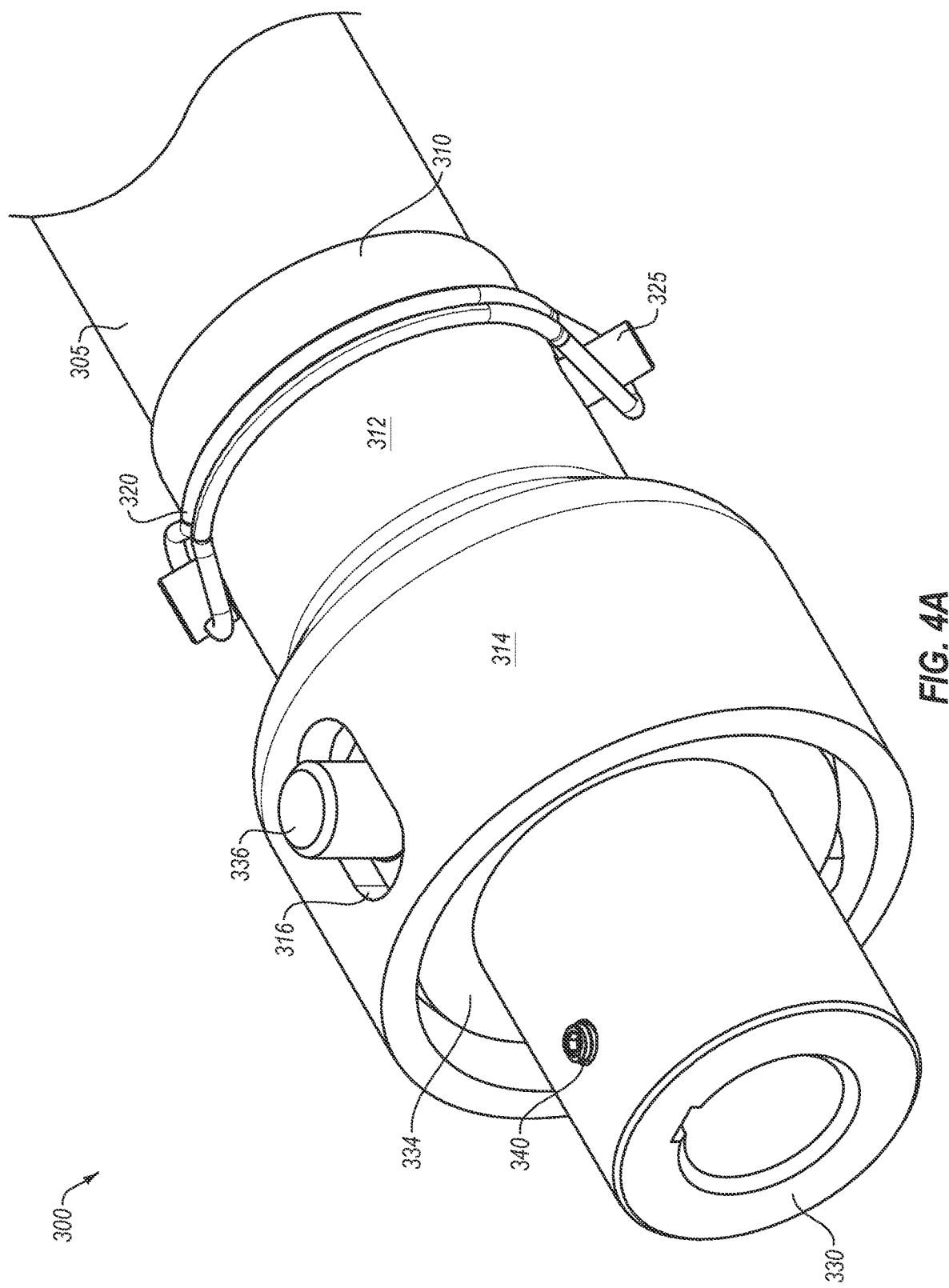
FIG. 4A illustrates a perspective view of a third example embodiment of a driveline joint according to the present disclosure.
Figure 4B:
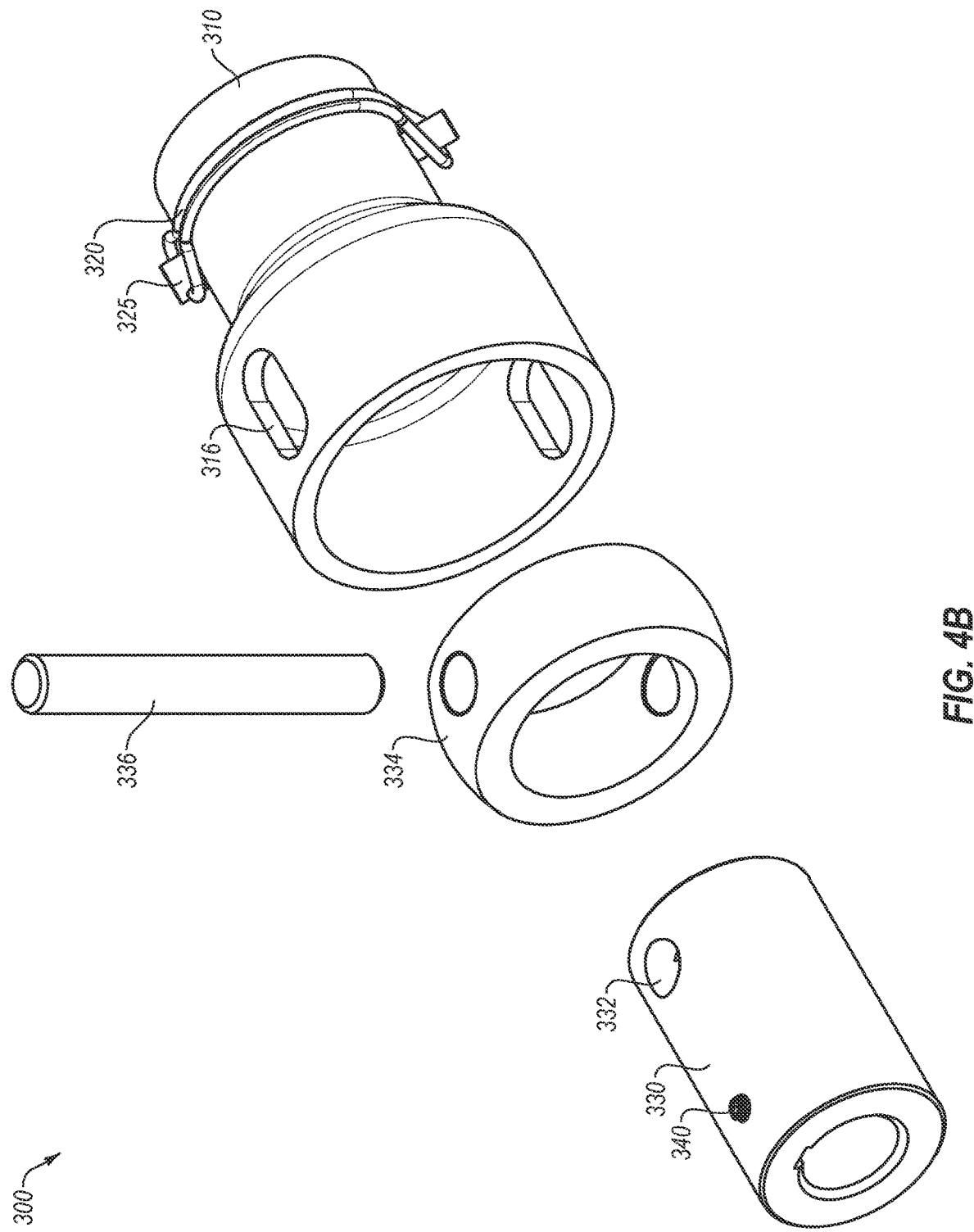
FIG. 4B illustrates an exploded view of the third example embodiment of the driveline join according to the present disclosure.

The shaft coupling 230 may include a keyed opening 236 that provides an interface for an output shaft, a U-joint, another driveline shaft piece, or any other components. The keyed indent may include a notch 238, and any driveline component that includes a corresponding notch shape may be inserted through the keyed opening 236. After insertion through the keyed opening 236, a set screw, a bolt, or any other type of fastener (such as a set screw 340 as illustrated in FIGS. 4A and 4B) may be used to secure the driveline component in place relative to the shaft coupling 230. For example, an output shaft attached to a gearbox at the end of the driveline may include such a notched end, and the output shaft may be inserted into and locked in place via the keyed opening 236 of the shaft coupling 230 by the set screw or any other fastener.

FIG. 4A illustrates a perspective view of a third example embodiment of a driveline joint 300 according to the present disclosure, and FIG. 4B illustrates an exploded view of driveline joint 300. The driveline joint 300 may include an outer housing 310, a shaft coupling 330, an annulus ring 334, a pin 336, and a connecting hinge 320. In some embodiments, the outer housing 310 may have a flared shape that is the same as or similar to the flared shape of the outer housing 210 described above in relation to the driveline joint 200 FIG. 3. Additionally or alternatively, an unflared portion 312 of the outer housing 310 may be coupled to a driveline shaft 305 via the connecting hinge 320 in the same or a similar manner as the unflared portion 212 is coupled to the driveline shaft 205 via the connecting hinge 220 as described in relation to the driveline joint 200.

A flared portion 314 of the outer housing 310 may include an inner diameter that allows placement of the annulus ring 334 within the interior of the flared portion 314 and one or more openings 316 through which the pin 336 may be inserted. As illustrated in FIG. 4B, the shaft coupling 330 may include one or more openings 332 that may align with openings in the annulus ring 334 and the openings 316 of the outer housing 310. Once aligned, the pin 336 may be inserted through the openings of the shaft coupling 330, the annulus ring 334, and the outer housing 310 to secure the three components together.

In some embodiments, the pin 336 may be locked in place to prevent the pin 336 from sliding out and allowing misalignment of one or more of the shaft coupling 330, the annulus ring 334, and/or the outer housing 310. For example, the pin 336 may include a threaded outer surface, and a nut may be threaded onto the top and/or the bottom of the pin 336 to prevent sliding of the pin 336. As additional or alternative examples, a wire lock, a C-hinge, a perpendicular screw, an interference fit, or any other locking mechanisms may be used to fix the position of the pin 336.

In some embodiments, the annulus ring 334 may include a spherical shape that is the same as or similar to the shape of the spherical bearings 232 described above in relation to the driveline joint 200 of FIG. 2 in the form of a ring. Stated another way, the annulus ring 334 may take the shape of a hollow sphere with portions clipped off of either end. The annulus ring 334 may include a curved outer and inner profile like a surface of a sphere so that the shaft coupling 330 may be allowed some degree of rotation and movement when coupled to the outer housing 310. For example, the spherical curvature of the outer surface of the annulus ring 334 may correspond to the curvature of the inner surface of the flared portion 314 of the outer housing 310.

The annulus ring 334 may operate in the same or similar manner as the spherical bearings 132 of FIGS. 1A-1D and FIG. 2 such that the pin 336 may travel within the slot to accommodate the misalignment between the shaft coupling 330 and the driveline shaft 305 with the annulus ring 334 acting as a bearing between the flared portion 314 of the outer housing 310 and the shaft coupling 330. As illustrated in FIG. 4A, for example, the opening 316 includes a substantially greater width than a cross-sectional profile of the pin 336. Any misalignment between the shaft coupling 330 and the driveline shaft 305 may cause the pin 336 to shift within the opening 316 because of the curvature of the annulus ring 334 without causing damage to the outer housing 310, the shaft coupling 330, or the rest of the driveline shaft 305. In other words, the pin 336 and the annulus ring 334 may function as a joint between the shaft coupling 330 and the outer housing 310 that allows some degree of rotational mobility, which may accommodate any misalignment between the shaft coupling 330 and the outer housing 310 within some tolerance limit.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A driveline joint, comprising:
   a driveline shaft including one or more slots, the driveline shaft configured to be operatively coupled to one or more photovoltaic (PV) modules;
   a shaft coupling configured to be operatively positioned within an interior of the driveline shaft, the shaft coupling including one or more openings, each of the one or more openings corresponding to a slot of the one or more slots;
   one or more bearings, each bearing positioned radially between the driveline shaft and the shaft coupling; and
   one or more fasteners, wherein each of the one or more fasteners extends through one of the one or more slots, through one of the one or more bearings, and through one of the one or more openings so as to operatively engage a bearing surface of the one or more bearings against the exterior surface of the shaft coupling, the bearing surface compensating for a degree of angular misalignment between the driveline shaft and the shaft coupling.

2. A driveline joint, comprising:
   a driveline shaft including one or more slots, the driveline shaft configured to be operatively coupled to one or more photovoltaic (PV) modules;
   a shaft coupling configured to be operatively positioned within an interior of the driveline shaft, the shaft coupling including one or more openings, each of the one or more openings corresponding to a slot of the one or more slots;
   one or more fasteners, wherein each of the one or more fasteners extends through one of the one or more slots and through one of the one or more openings so as to operatively engage a bearing surface of a bearing against the exterior surface of the shaft coupling, the bearing surface compensating for a degree of angular misalignment between the driveline shaft and the shaft coupling; and
   a first pressure plate positioned in the interior of the driveline shaft to provide a first spring force against the shaft coupling.

3. The driveline joint of claim 2, further comprising a second pressure plate positioned in the interior of the driveline shaft to provide a second spring force against the shaft coupling in a direction opposite to the first spring force provided by the first pressure plate.

4. The driveline joint of claim 1, wherein the bearing includes a curved profile corresponding to an inner surface of the driveline shaft.

5. A driveline joint, comprising:
   a driveline shaft including one or more slots, the driveline shaft configured to be operatively coupled to one or more photovoltaic (PV) modules;
   a shaft coupling configured to be operatively positioned within an interior of the driveline shaft, the shaft coupling including one or more openings, each of the one or more openings corresponding to a slot of the one or more slots, wherein the shaft coupling includes a keyed opening facilitating attachment an output shaft via a corresponding keyed feature of the output shaft; and
   one or more fasteners, wherein each of the one or more fasteners extends through one of the one or more slots and through one of the one or more openings so as to operatively engage a bearing surface of a bearing against the exterior surface of the shaft coupling, the bearing surface compensating for a degree of angular misalignment between the driveline shaft and the shaft coupling.

6. The driveline joint of claim 1, wherein each of the one or more slots has a length that corresponds to the degree of angular misalignment between the driveline shaft and the shaft coupling.

7. A driveline joint, comprising:
   a driveline shaft including one or more slots, the driveline shaft configured to be operatively coupled to one or more photovoltaic (PV) modules;

a shaft coupling configured to be operatively positioned within an interior of the driveline shaft, the shaft coupling including one or more openings, each of the one or more openings corresponding to a slot of the one or more slots; and one or more fasteners, wherein each of the one or more fasteners extends through one of the one or more slots and through one of the one or more openings so as to operatively engage a bearing surface of a bearing against the exterior surface of the shaft coupling, the bearing surface compensating for a degree of angular misalignment between the driveline shaft and the shaft coupling;

wherein:

the driveline shaft includes a flared section at a proximal end of the driveline shaft that includes a greater diameter than a diameter corresponding to the rest of the driveline shaft; and the interior of the driveline shaft in which the shaft coupling is positioned is the flared section of the driveline shaft at the proximal end of the driveline shaft.

8. The driveline joint of claim 7, wherein the bearing comprises an annulus ring positioned in the flared section of the driveline shaft, wherein the annulus ring includes:

a shape and an inner diameter that corresponds to a cross-sectional shape and a diameter of the shaft coupling, the shaft coupling being configured to interface with the annulus ring.

9. The driveline joint of claim 8, wherein the annulus ring includes a curved profile corresponding to an inner surface of the driveline shaft.

10. A driveline joint, comprising:

a driveline shaft including one or more slots, the driveline shaft configured to be operatively coupled to one or more photovoltaic (PV) modules;

an outer housing configured to be attached to an end of the driveline shaft, the outer housing including a plurality of housing openings;

a shaft coupling positioned in an interior of the outer housing, the shaft coupling including one or more shaft openings, each of the shaft openings corresponding to a corresponding slot of the plurality of slots included in the driveline shaft and a corresponding housing opening of the plurality of housing openings; and one or more fasteners, wherein each of the one or more fasteners extends through one of the slots of the driveline shaft, one of the housing openings of the outer housing, and one of the shaft openings of the shaft coupling so as to operatively engage a bearing surface of a bearing against the exterior lateral surface of the shaft coupling, the bearing surface compensating for a degree of angular misalignment between the driveline shaft and the shaft coupling.

11. The driveline joint of claim 10, further comprising a first pressure plate positioned in the interior of the driveline shaft to provide a first spring force against the shaft coupling.

12. The driveline joint of claim 11, further comprising a second pressure plate positioned in the interior of the driveline shaft to provide a second spring force against the shaft coupling in a direction opposite to the first spring force provided by the first pressure plate.

13. The driveline joint of claim 10, wherein the bearing includes a curved profile corresponding to an inner surface of the outer housing.

14. The driveline joint of claim 10, wherein the shaft coupling includes a keyed opening facilitating attachment of the shaft coupling to an output shaft via a corresponding keyed feature of the output shaft.

15. The driveline joint of claim 10, wherein:

the outer housing includes a flared section at a proximal end of the outer housing that includes a greater diameter than a diameter corresponding to the rest of the outer housing; and the interior of the outer housing in which the shaft coupling is positioned is the flared section of the outer housing at the proximal end of the outer housing.

16. The driveline joint of claim 15, wherein the bearing comprises an annulus ring positioned in the flared section of the outer housing, wherein the annulus ring includes:

a shape and an inner diameter that corresponds to a cross-sectional shape and a diameter of the shaft coupling, the shaft coupling being configured to interface with the annulus ring; and one or more openings shaped and sized so that the fasteners are configured to extend through the openings of the annulus ring and fasten the driveline shaft, the outer housing, the annulus ring, and the shaft coupling together.

17. The driveline joint of claim 16, wherein the annulus ring includes a curved profile corresponding to an inner surface of the outer housing.

18. A driveline joint, comprising:

a driveline shaft that includes one or more slots, the driveline shaft configured to be operatively coupled to one or more photovoltaic (PV) modules;

a shaft coupler positioned within an interior of the driveline shaft, wherein the shaft coupler includes one or more openings and each of the one or more openings corresponds to a slot of the one or more slots; and one or more fasteners, wherein each of the one or more fasteners extends through one of the one or more slots and through one of the one or more openings and when coupled to the shaft coupler, each of the one or more fasteners is movable axially within a corresponding slot relative to the driveline shaft to permit angular misalignment between an axis of the driveline shaft and an axis of the shaft coupler.

* * * * *